Oct. 21, 1924.
A. KUHN
MILK AND COFFEE DISPENSER
Filed Nov. 24, 1922
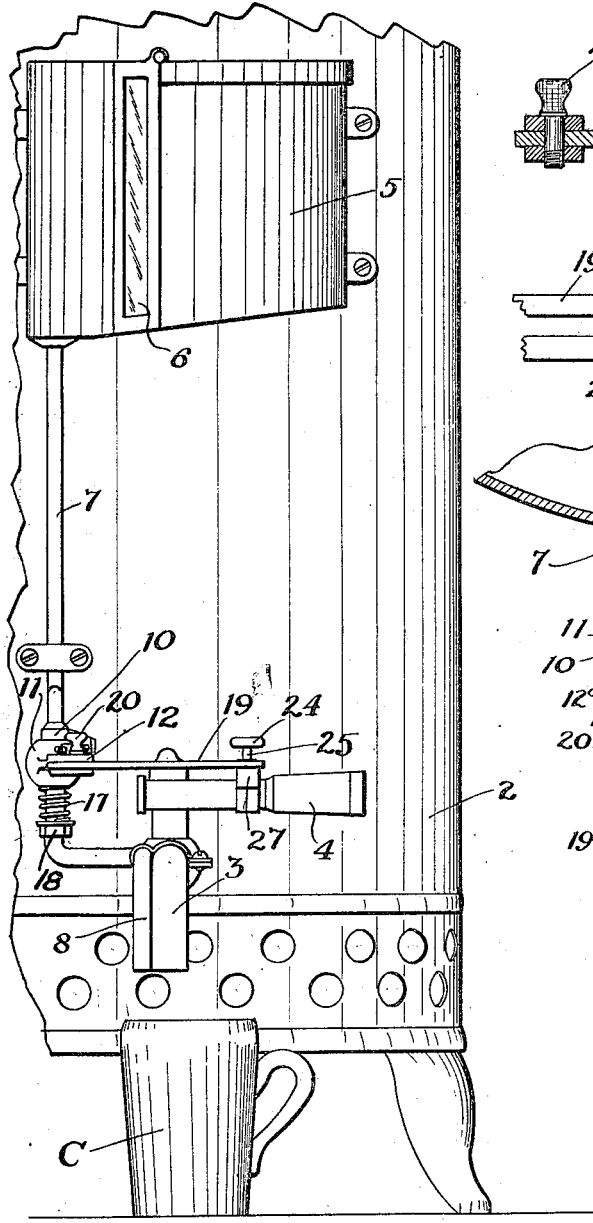
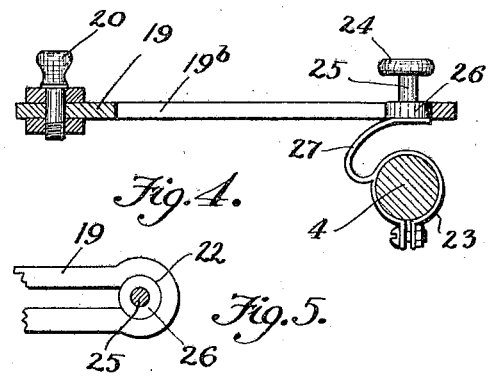
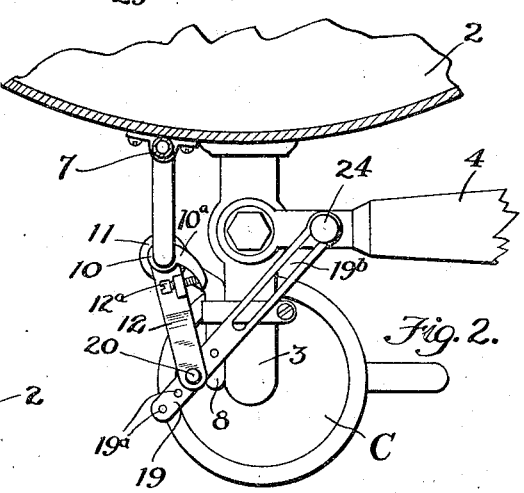
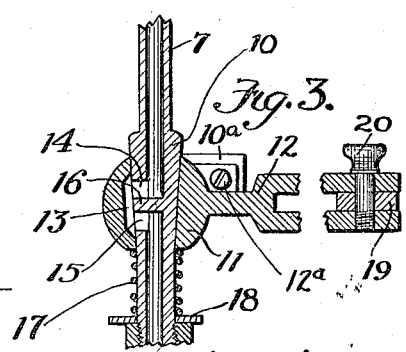
Inventor,
Albert Kuhn
by Hazard and Miller
Attys Patented Oct. 21, 1924.

1,512,341

UNITED STATES PATENT OFFICE.

ALBERT KUHN, OF PASADENA, CALIFORNIA.

MILK AND COFFEE DISPENSER.

Application filed November 24, 1922. Serial No. 603,021.

*To all whom it may concern:*

Be it known that I, ALBERT KUHN, a citizen of the United States, residing at Pasadena, in the county of Los Angeles and State of California, have invented new and useful Improvements in Milk and Coffee Dispensers, of which the following is a specification.

This invention relates to a liquid dispensing apparatus, and more particularly to dispensers for cream or milk and coffee.

It is an object of the invention to provide a simple and practical dispenser for operating a milk or cream controlling valve and by the action of a coffee faucet so that the two liquids will be discharged at the one time into the contiguous receiver such as a cup.

Other objects and advantages will be made manifest in the following specification of an embodiment of the invention shown in the accompanying drawings, wherein:

Figure 1 is an elevation of a fragment of a coffee dispensing tank combined with the milk or cream device.

Fig. 2 is a plan showing the means for connecting the milk valve and coffee faucet.

Fig. 3 is a central section through the milk dispensing valve showing it in the open position.

Fig. 4 is a detail of the disconnecting button.

Fig. 5 is a detail of the slotted link.

The present invention is shown as combined with a tank 2 of any suitable form having a discharge faucet 3 for controlling discharge of liquid. The faucet is provided with a suitable handle 4 whereby it may be opened and closed.

Mounted suitably and preferably upon the front of the tank 2 is a milk or cream receptacle 5 which is shown as provided with a level gauge 6 to disclose the contents thereof. Leading from the bottom of the milk receptacle 5 is a discharge pipe 7 which has its lower end 8 in close contiguity with the discharge faucet 3 so that milk or cream and coffee can be discharged into a receiver such as a mug or cup C.

To provide for the concurrent discharge of milk with coffee means are provided for connecting the handle 4 of the coffee valve to a suitable faucet in the milk discharging pipe 7. A form of milk valve is shown as consisting of a fixed core or body 10 connected to the milk pipe 7 and the body is shown as tapered to form a tight fit with a turnable shell 11 having a radially projecting lever arm 12. The tapered bore of the shell 11 is provided with an elongated passageway 13 and this is adapted to be brought into register with ports 14 and 15 in the body 10 and which are separated by an intermediate wall 16. The valve shell or casing 11 is pushed upon the tapered body 10 as by an expansion spring 17 the opposite end of which rests upon any suitable support 18.

The coffee faucet handle 4 is connected by means of a link 19 to the lever arm 12 of the milk valve so that when the coffee handle 4 is swung around to open the faucet the milk valve will be opened at the same time by bringing the passageway 13 in the shell 11 into register with the upper end of the lower ports 14 and 15 whence the milk or cream passes down through the milk pipe to the outlet end 8.

It is desirable to provide means for regulating the quantity of milk mixed with the coffee, and this is accomplished by providing the link 19 with the plurality of apertures 19$^a$. By adjusting the pivot pin 20, provided on the lever arm 12 in one of the apertures 19$^a$, the degree of opening of the milk valve will be controlled by the degree of register of the passageway 13 with the ports 14 and 15.

From the above it will be seen that I have provided an extremely simple and inexpensive and practical form of apparatus whereby milk or cream and coffee can be concurrently discharged from separate containers by the actuation of a single controlling handle.

It is sometimes desirable to draw coffee from the dispensing urn and not to add milk or cream thereto, and a feature of my present invention consists in providing means for readily connecting and disconnecting the coffee handle 4 to the milk lever 12. I have devised a device that is adapted to be readily applied to the usual coffee handle without any change thereof whatsoever, and which device is so constructed and arranged that it can be instantly pressed by the thumb and finger of the hand grasping the handle, so that when it is desired to draw coffee without milk, it is only necessary to disconnect the handle from the connecting link 19 and then operate the handle in the usual manner without operating the milk lever.

As clearly shown in Figs. 2, 4 and 5, the link 19 is provided with a longitudinal slot 19ᵇ leading to its outer end at which the slot is provided with an enlargement 22. On the coffee handle there is arranged a suitable device shown as consisting of a split clamp ring 23 to be closed around the handle, and on this is yieldingly mounted a button 24 having a reduced neck 25 and an enlarged base 26. The button is normally thrust upwardly so that its base 26 registers in the enlarged socket portion 22 of the slotted link 19. The connection of the button and the link may be accomplished by any suitable means, and as here shown consists of a simple spring 27, one end of which is attached to the clamping band 23, and the outer end of which is secured to the base 26 of the button so that this base is normally thrust up into interlocking position with the link 19.

In the normal position of the connecting device, the button 26 interlocks with the link 19 and when the faucet handle 4 is oscillated it will be seen that the link 19 will be shifted with the movement of the handle 4 and thus will open and close the milk valve. In the normal closed position of the coffee faucet handle 4, it, in most dispensing urns, lies close to the front of the urn. When it is desired to dispense coffee without the addition of milk or cream, the operator then simply grasps the handle and depresses the button 24 to disconnect the base 26 of the button from the link 19, this action shifting the reduced neck 25 of the button into the aperture so that when the handle 4 is thrown around, the reduced neck will slide freely into the longitudinal slot 19ᵇ of the link 19, therefore, without transmission of motion to the link and to the milk lever 12. The handle can then be thrown back and at the same time the button 24 can be released so that it will be connected to the link 19 when the handle is in the normally closed position as shown in Fig. 2. To give desired rigidity to the connecting link 19, it is mounted in the forked outer end of the milk lever 12.

Any suitable stop of limited means may be provided, if desired, to control the movement of the milk lever, which is here shown as having an adjustable stop pin 12ᵃ to engage a contiguous fixed lug as 10ᵃ of the valve body or plug 10.

Further embodiments, variations and changes may be resorted to within the spirit of the invention as here claimed.

What is claimed is:

1. A milk and coffee dispenser comprising a coffee tank having an outlet faucet, a milk holder having a pipe with a discharge end contiguous to the outlet of said faucet, said milk pipe having a plug-like body portion provided with spaced ports, a valve shell turnably mounted on said body and having a passageway to concurrently register with said ports, a lever arm for said shell, and an operating connection between said lever arm and the handle of the coffee faucet whereby coffee and milk can be concurrently discharged.

2. In combination with the faucet of a coffee dispenser, a milk or cream holder having a discharge pipe terminating in proximity to the outlet of said faucet, a valve in the milk pipe, and connections between the milk valve and the faucet of the coffee dispenser whereby the milk valve may be operated concurrently with the coffee faucet, said connections including means for readily coupling and uncoupling the coffee faucet and the milk valve so that the coffee faucet can be operated independently to secure the discharge of coffee without the addition of milk or cream.

In testimony whereof I have signed my name to this specification.

ALBERT KUHN.